United States Patent [19]

Hanmore

[11] Patent Number: 4,726,595
[45] Date of Patent: Feb. 23, 1988

[54] SHAFT SEALING DEVICE WITH SPHERICAL PORTION AND WIPER SEALS

[75] Inventor: John E. Hanmore, Watton at Stone, England

[73] Assignee: Glaxo Group Limited, London, England

[21] Appl. No.: 795,438

[22] Filed: Nov. 6, 1985

Related U.S. Application Data

[63] Continuation of Ser. No. 540,494, Oct. 11, 1983, abandoned.

[30] Foreign Application Priority Data

Oct. 11, 1982 [GB] United Kingdom ............... 8229031

[51] Int. Cl.[4] .............................................. F16J 15/26
[52] U.S. Cl. ..................................... 277/30; 285/160; 403/131; 403/370
[58] Field of Search ..................... 277/30, 31; 74/503; 403/131, 135, 122, 370; 285/160, 261

[56] References Cited

U.S. PATENT DOCUMENTS

| 909,263 | 1/1909 | Walters | 277/30 |
| 947,265 | 1/1910 | Walters | 277/30 |
| 3,721,453 | 3/1973 | Likavec | 277/30 |

FOREIGN PATENT DOCUMENTS

| 4858 | 2/1920 | Netherlands | 285/160 |
| 737215 | 9/1955 | United Kingdom | 285/160 |

Primary Examiner—Robert S. Ward
Attorney, Agent, or Firm—McAulay, Fields, Fisher, Goldstein & Nissen

[57] ABSTRACT

A shaft sealing device has a body containing a spherical portion of a sealing element which also has a tubular portion extending outside the body. The shaft extends through both portions of the sealing element. A pair of annular wiper seals is located within the body and bear against the spherical portion of the sealing element. The wiper seals are separated by a cylindrical spacer. A thrust washer urges the wiper seals into contact with the spherical portion of the sealing element. A further sealing element surrounds the shaft outside the body and is partly engaged in a recess in the tubular portion of the sealing element. The sealing element has a curved outer surface and is urged into sealing contact with the recess in the tubular portion of the sealing element by means of a clamp nut screwed onto the outside of the tubular portion of the sealing element.

4 Claims, 1 Drawing Figure

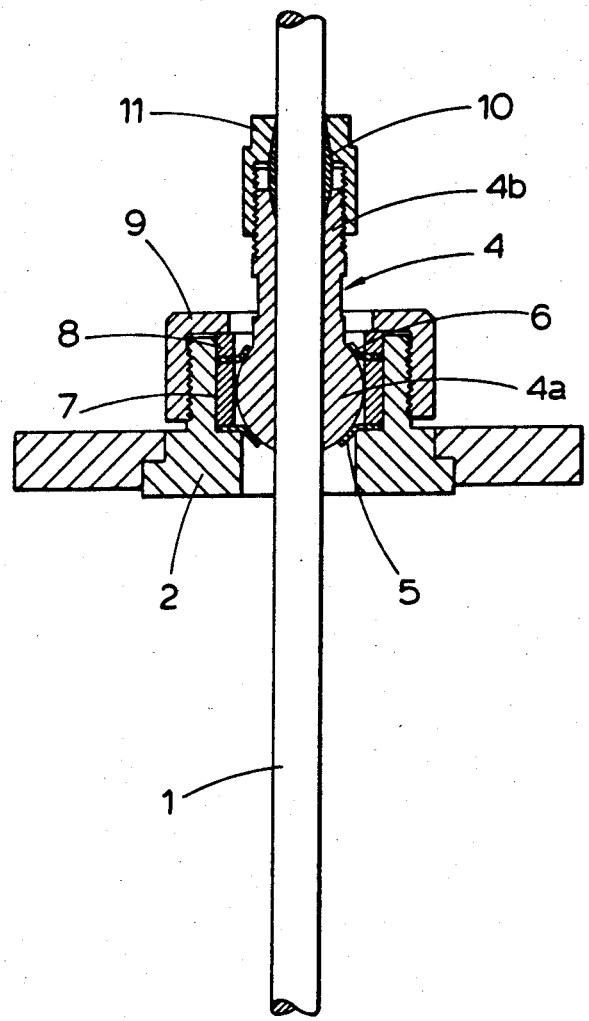

SHAFT SEALING DEVICE WITH SPHERICAL PORTION AND WIPER SEALS

This is a continuation of application Ser. No. 540,494 filed Oct. 11, 1983, now abandoned.

BACKGROUND OF THE INVENTION

This invention relates to the sealing of vessels at positions where a shaft enters the vessel.

The invention is particularly but not exclusively intended for use in sealing chemical process vessels, such as reaction vessels, where rotatable shafts enter the vessels for the purpose of rotating an agitator or other member within the vessel. In such chemical processing vessels it is obviously necessary so far as possible to prevent any significant escape of the contents of the vessel around the shaft. This is especially difficult when the vessel is maintained at an internal pressure higher than atmospheric pressure. In some cases, such vessels are maintained at pressures which are lower than atmospheric pressure and in that case it is necessary so far as possible to prevent the ingress of any material from outside the vessel. It is usual to employ stuffing boxes as such seals. An object of the present invention is to provide an alternative seal to a stuffing box.

BRIEF SUMMARY OF THE INVENTION

According to one aspect of the invention, a shaft to be sealed extends through a body or housing and has a spherical portion within the body or housing and an annular wiper seal is also located within the body or housing, means being provided for urging the wiper seal into contact with the spherical body.

According to another aspect of the invention, a shaft sealing device comprises a body containing a spherical portion of a sealing element which also has a tubular portion extending outside the body, the said shaft extending through both portions; a pair of annular wiper seals located within the body and bearing against the spherical portion of the sealing element, the said wiper seals being separated by a cylindrical spacer and being urged by a thrust element into sealing contact with the spherical portion of the sealing element and, outside the body, a further sealing element surrounding the shaft and partly engaged in a recess in the tubular portion of the sealing element, the said further sealing element having a curved outer surface and being urged into sealing contact with the recess in the tubular portion of the sealing element by means of a clamp member screwed on to the outside of the tubular portion of the sealing element.

BRIEF DESCRIPTION OF THE ACCOMPANYING DRAWING

The single FIGURE of the drawing is a schematic sectional view of a shaft seal arrangement.

DESCRIPTION OF PREFERRED EMBODIMENTS

In the illustrated embodiment, a shaft 1 intended to enter a chemical process vessel, such as a reaction vessel, and to rotate an agitator therein is conveniently of stainless steel and is enclosed in a sheath of chemically inert material, for example PTFE.

The shaft enters the reaction vessel through a seal comprising a generally cylindrical body 2 which is a push-fit in a mounting flange which can be secured to the outside of the chemical process vessel. Surrounding the shaft 1 and fitted within the body 2 is a ball-spindle sealing element 4. As will be seen from the drawing, this element comprises a spherical portion 4a fitted within the body and an integral tubular portion 4b which extends out of the body. This sealing element 4 is also made of PTFE. Inside the body and bearing on the outside of the spherical ball portion 4a of the sealing element 4 is a lower annular wiper sealing washer 5 and an upper annular wiper sealing washer 6. These two wiper sealing washers are spaced by a cylindrical spacer 7 and a thrust washer 8 bears on the upper wiper sealing element 6. A metal body clamping member 9 is screwed on to the outside of the body 2 and presses against the thrust washer 8. This causes the two wiper sealing elements to make sealing contact with the outside of the spherical ball portion of the sealing element 4.

The external tubular portion 4b of the ball-spindle element 4 has an internal tapered recess at one end in which a further sealing element 10, hereinafter, called an olive, is received. This olive 10 surrounds the shaft 1 and has a curved outer surface partly engaged in the tapered recess of the element 4. The olive is also partly engaged in a complementary recess in a second clamping nut 11 which is screwed on to the tubular portion 4b of the ball-sealing element 4 to urge the olive into sealing engagement with the recess in the ball-spindle element 4.

With this arrangement the main sealing effect is produced by contact between the wiper seals 5 and 6 and the spherical portion 4a of the element 4. There is a substantial area of contact between these elements and this substantial area of contact enables the seal to accommodate irregularities produced by wear.

The sealing device of the present invention does not require such accurate alignment of the shaft as is normally required where a stuffing box is used.

It is not essential to use PTFE for the various parts stated to be of that material as the PTFE can be replaced by another chemically inert material where desired.

The device illustrated may be modified by having only a single wiper seal.

What is claimed is:

1. A shaft sealing device comprising a body containing a spherical portion of a sealing element which also has a tubular portion extending outside the body, the said shaft extending through both portions; a pair of annular wiper seals located within the body and bearing against the spherical portion of the sealing element, the said wiper seals being separated by a cylindrical spacer and being urged by a thrust element into sealing contact with the spherical portion of the sealing element and, outside the body, a further sealing element surrounding the shaft and partly engaged in a recess in the tubular portion of the sealing element, the said further sealing element having a curved outer surface and being urged into sealing contact with the recess in the tubular portion of the sealing element by means of a clamp member screwed onto the outside of the tubular portion of the sealing element.

2. A device as claimed in claim 1 wherein the shaft is enclosed in a sheath of chemically inert material and the sealing element is also made of a chemically inert material.

3. A device as claimed in claim 1 wherein a further clamping member is screwed on the outside of the body and is arranged to press against the thrust washer whereby to urge the wiper sealing elements into sealing contact with the spherical portion of the sealing element.

4. A device as claimed in claim wherein a further clamping member is screwed on the outside of the body and is arranged to press against the thrust washer whereby to urge the wiper sealing elements into sealing contact with the spherical portion of the sealing element.

* * * * *